US012555836B2

(12) United States Patent
Jeong et al.

(10) Patent No.: US 12,555,836 B2
(45) Date of Patent: Feb. 17, 2026

(54) BATTERY MANAGEMENT APPARATUS AND METHOD FOR SETTING DISCHARGE CURRENT BASED ON RESISTANCE RATIOS

(71) Applicant: LG ENERGY SOLUTION, LTD., Seoul (KR)

(72) Inventors: Hee-Seok Jeong, Daejeon (KR); Yoon-Jung Bae, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 585 days.

(21) Appl. No.: 17/925,342

(22) PCT Filed: Feb. 9, 2022

(86) PCT No.: PCT/KR2022/095026
§ 371 (c)(1),
(2) Date: Nov. 15, 2022

(87) PCT Pub. No.: WO2022/173283
PCT Pub. Date: Aug. 18, 2022

(65) Prior Publication Data
US 2023/0178818 A1 Jun. 8, 2023

(30) Foreign Application Priority Data
Feb. 9, 2021 (KR) ........................ 10-2021-0018521

(51) Int. Cl.
*H01M 10/48* (2006.01)
*G01R 31/389* (2019.01)
(Continued)

(52) U.S. Cl.
CPC .......... *H01M 10/48* (2013.01); *G01R 31/389* (2019.01); *H01M 4/364* (2013.01); *H01M 4/386* (2013.01);
(Continued)

(58) Field of Classification Search
CPC .... H01M 10/48; H01M 10/44; H01M 10/425; H01M 4/364; H01M 4/386; H01M 4/587;
(Continued)

(56) References Cited

U.S. PATENT DOCUMENTS

2011/0084702 A1   4/2011   Mori
2012/0086368 A1   4/2012   Kawabuchi et al.
(Continued)

FOREIGN PATENT DOCUMENTS

CN    102043132 A    5/2011
CN    107819339 A    3/2018
(Continued)

OTHER PUBLICATIONS

Extended European Search Report including Written Opinion for Application No. 22753043.3 dated Mar. 15, 2024, pp. 1-6.
(Continued)

*Primary Examiner* — Raymond Alejandro
(74) *Attorney, Agent, or Firm* — Lerner David LLP

(57) ABSTRACT

A battery management apparatus includes a measuring unit configured to measure a charge voltage, a charge current, a discharge voltage and a discharge current in the process of charging and discharging a battery according to a preset charge C-rate and a preset discharge C-rate, and a control unit configured to receive information about the voltage and current of the battery from the measuring unit, calculate a charge resistance for each voltage of the battery based on the charge voltage and the charge current, calculate a discharge resistance for each voltage of the battery based on the discharge voltage and the discharge current, calculate a resistance ratio between the charge resistance and the discharge resistance for each voltage of the battery, and set a discharge C-rate for the battery based on the resistance ratio calculated for each voltage of the battery.

12 Claims, 4 Drawing Sheets

(51) Int. Cl.
  *H01M 4/36* (2006.01)
  *H01M 4/38* (2006.01)
  *H01M 4/587* (2010.01)
  *H01M 10/42* (2006.01)
  *H01M 10/44* (2006.01)
  *H02J 7/00* (2006.01)
  *H01M 4/02* (2006.01)

(52) U.S. Cl.
  CPC ......... *H01M 4/587* (2013.01); *H01M 10/425* (2013.01); *H01M 10/44* (2013.01); *H02J 7/0069* (2020.01); *H01M 2004/027* (2013.01); *H01M 2010/4271* (2013.01)

(58) Field of Classification Search
  CPC .... H01M 2004/027; H01M 2010/4271; G01R 31/389; H02J 7/0069
  See application file for complete search history.

(56) References Cited

U.S. PATENT DOCUMENTS

| | | |
|---|---|---|
| 2013/0066573 A1 | 3/2013 | Bond et al. |
| 2014/0132223 A1* | 5/2014 | Kerfoot, Jr. .......... G01R 31/386 320/136 |
| 2015/0058654 A1 | 2/2015 | Ukai et al. |
| 2016/0056510 A1* | 2/2016 | Takeuchi ............ H01M 10/425 429/50 |
| 2017/0207497 A1 | 7/2017 | Chae et al. |
| 2018/0076633 A1 | 3/2018 | Fujita et al. |
| 2019/0056457 A1* | 2/2019 | Li ....................... H01M 10/482 |
| 2019/0219641 A1 | 7/2019 | Iwane et al. |
| 2020/0014230 A1 | 1/2020 | Zhang |
| 2020/0200829 A1 | 6/2020 | Lee |
| 2021/0068033 A1* | 3/2021 | Seon .................... H04W 28/04 |
| 2021/0190878 A1 | 6/2021 | Lee et al. |
| 2021/0218262 A1 | 7/2021 | Bae et al. |
| 2021/0242508 A1* | 8/2021 | Millen ................. H04L 63/123 |
| 2021/0249886 A1* | 8/2021 | Moon ................. H01M 10/443 |
| 2021/0318388 A1 | 10/2021 | Bae et al. |

FOREIGN PATENT DOCUMENTS

| | | |
|---|---|---|
| JP | 201285452 A | 4/2012 |
| JP | 2013195232 A | 9/2013 |
| JP | 5565276 B2 | 8/2014 |
| JP | 2015041517 A | 3/2015 |
| JP | 5753140 B2 | 7/2015 |
| JP | 2020517076 A | 6/2020 |
| KR | 101201110 B1 | 11/2012 |
| KR | 20160080802 A | 7/2016 |
| KR | 101922478 B1 | 11/2018 |
| KR | 101979536 B1 | 5/2019 |
| KR | 20190054512 A | 5/2019 |
| KR | 20200030467 A | 3/2020 |
| KR | 20200062672 A | 6/2020 |
| KR | 20200111015 A | 9/2020 |
| KR | 20200111017 A | 9/2020 |
| WO | 2018-056448 A1 | 3/2018 |

OTHER PUBLICATIONS

International Search Report for Application No. PCT/KR2022/095026 mailed May 18, 2022, pp. 1-3.

Search Report dated Apr. 16, 25 from the Office Action for Chinese Application No. 202280004884.0 issued Apr. 29, 2025, pp. 1-2.

* cited by examiner

BATTERY MANAGEMENT APPARATUS AND METHOD FOR SETTING DISCHARGE CURRENT BASED ON RESISTANCE RATIOS

CROSS-REFERENCE TO RELATED APPLICATIONS

The present application is a national phase entry under 35 U.S.C. § 371 of International Application No. PCT/KR2022/095026 filed Feb. 9, 2022, which claims priority from Korean Patent Application No. 10-2021-0018521 filed Feb. 9, 2021, all of which are incorporated herein by reference

TECHNICAL FIELD

The present disclosure relates to a battery management apparatus and method, and more particularly, to a battery management apparatus and method capable of improving the performance efficiency of a battery.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

In addition, recently, in order to achieve various goals such as high capacity and high output of the battery, research on negative electrode active material in which two or more materials are mixed is being conducted. However, since two or more materials have different charge/discharge efficiencies and different reaction voltage ranges from each other, battery degradation issues arise due to rapid degradation of a material with relatively low charge/discharge efficiency. Therefore, for a battery including a negative electrode active material in which two or more kinds of materials are mixed, it is necessary to prepare a way to increase the lifespan.

SUMMARY

Technical Problem

The present disclosure is designed to solve the problems of the related art, and therefore the present disclosure is directed to providing a battery management apparatus and method capable of increasing the performance efficiency and lifespan of a battery by adjusting a discharge C-rate.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery management apparatus according to one aspect of the present disclosure may comprise: a voltage sensor configured to measure a charge voltage and a discharge voltage during charging and discharging a battery according to a preset charge current rate (C-rate) and a preset discharge C-rate; a current sensor configured to measure a charge current and a discharge current during the charging and discharging of the battery; and a controller configured to: calculate a charge resistance for each measured charge voltage of the battery based on the charge voltage and the charge current measured during charging the battery, calculate a discharge resistance for each measured discharge voltage of the battery based on the discharge voltage and the discharge current measured during discharging the battery, for each voltage level of the battery at which charge voltage and discharge voltage are measured, calculate a resistance ratio between the charge resistance at the voltage level and the discharge resistance at the voltage level, and set an updated discharge C-rate for the battery based on the calculated resistance ratios.

The resistance ratio may be a ratio of the charge resistance to the discharge resistance.

The controller may be configured to select a maximum resistance ratio from among the calculated resistance ratios; and adjust the discharge C-rate based on the selected maximum resistance ratio.

The controller may be configured to maintain the discharge C-rate at the preset discharge C-rate in response to the maximum resistance ratio being less than a reference value.

The controller may be configured to change the discharge C-rate to the updated discharge C-rate in response to the maximum resistance ratio being equal to or greater than the reference value.

The updated discharge C-rate may be greater than the preset charge C-rate.

The updated discharge C-rate may correspond to the maximum resistance ratio.

The updated discharge C-rate may be based on the maximum resistance ratio and a battery characteristic factor of the battery.

The battery may include a composite negative electrode active material in which graphite and silicon are mixed.

The voltage sensor may be configured to measure the charge voltage and the current sensor is configured to measure the charge current during charging the battery at the preset charge C-rate with a first constant current, and the voltage sensor may be configured to measure the discharge voltage and the current sensor is configured to measure the discharge current during discharging the battery at the preset discharge C-rate with a second constant current.

A battery pack according to another aspect of the present disclosure may comprise the battery management apparatus according to any of the embodiments of the present disclosure.

A battery management method according to still another aspect of the present disclosure may comprise: measuring, by a voltage sensor, a charge voltage and a discharge voltage during charging and discharging of a battery according to a preset charge C-rate and a preset discharge C-rate, respectively; measuring, by a current sensor, a charge current and a discharge current during the charging and discharging of the battery; calculating, by a controller, a charge resistance for each measured charge voltage of the battery based on the charge voltage and the charge current measured during charging the battery; calculating, by the controller, a discharge resistance for each voltage of the battery based on the discharge voltage and the discharge current; for each voltage level of the battery at which charge voltage and discharge voltage are measured, calculating, by the controller, a resistance ratio between the charge resistance at the voltage level and the discharge resistance at the voltage level; and setting, by the controller, a discharge C-rate for the battery based on the calculated resistance ratios.

Advantageous Effects

According to one aspect of the present disclosure, the battery management apparatus has an advantage of improving the performance efficiency of the battery and increasing the lifespan of the battery by adjusting the discharge C-rate of the battery.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
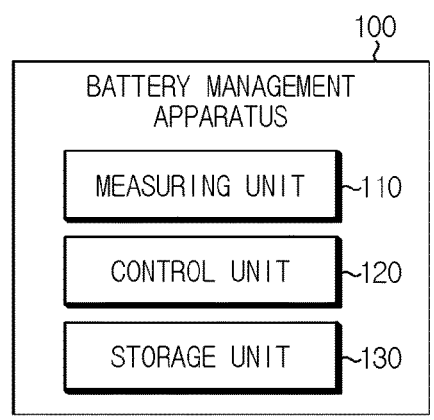
FIG. 1 is a diagram schematically showing a battery management apparatus according to an embodiment of the present disclosure.

FIG. 1 is a diagram schematically showing a battery management apparatus 100 according to an embodiment of the present disclosure.

Figure 2:
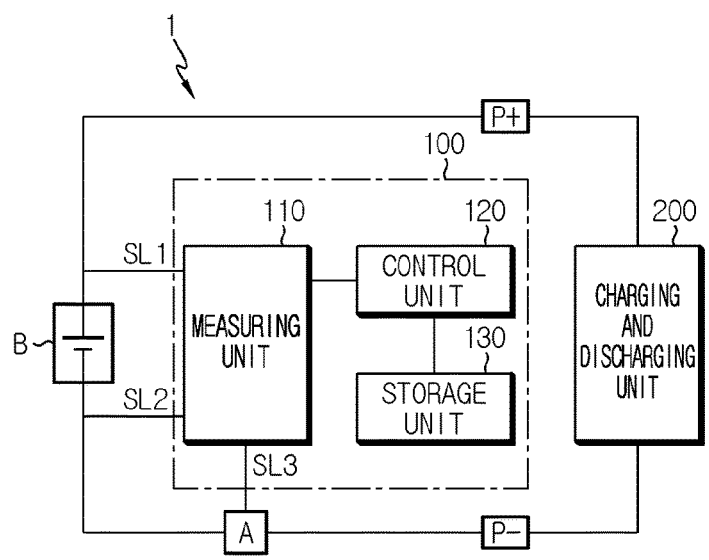
FIG. 2 is a diagram showing an exemplary configuration of a battery pack including the battery management apparatus according to an embodiment of the present disclosure.

FIG. 2 is a diagram showing an exemplary configuration of a battery pack 1 including the battery management apparatus 100 according to an embodiment of the present disclosure.

Referring to FIG. 1, the battery management apparatus 100 according to an embodiment of the present disclosure may include a measuring unit 110 and a control unit 120.

The measuring unit 110 may be configured to measure a charge voltage, a charge current, a discharge voltage and a discharge current in the process of charging and discharging a battery B according to a preset charge C-rate and a preset discharge C-rate.

The preset charge C-rate and the preset discharge C-rate may be a C-rate preset for the first time or a C-rate previously preset by the control unit 120. For example, the preset charge C-rate may be preset to 0.03 C, and the preset discharge C-rate may be preset to 0.03 C.

Here, the battery B means one physically separable independent cell including a negative electrode terminal and a positive electrode terminal. For example, a lithium-ion battery or a lithium polymer battery may be regarded as the battery B.

Preferably, the battery B exhibits a capacity in a SOC (State of Charge) bottom region, and may further include an additional active material having a large resistance hysteresis between resistance and voltage and low charge and discharge efficiency, compared to the basic active material. That is, the battery B may include a composite negative electrode active material in which the basic active material and the additional active material are mixed. For example, the battery B may be configured to include a composite negative electrode active material in which graphite and silicon are mixed. Here, graphite may be the basic active material, and silicon may be the additional active material.

The measuring unit 110 may be configured to measure the charge voltage and the charge current in the process of charging the battery B at the preset charge C-rate with a constant current, and to measure the discharge voltage and the discharge current in the process of discharging the battery B at the preset discharge C-rate with a constant current.

Specifically, in the embodiment of FIG. 2, the measuring unit 110 may be connected to a first sensing line SL1, a second sensing line SL2, and a third sensing line SL3. The measuring unit 110 may be connected to a positive electrode terminal of the battery B through the first sensing line SL1, and may be connected to a negative electrode terminal of the battery B through the second sensing line SL2. In addition, the measuring unit 110 may measure the voltage of the battery B by computing a difference between the voltage measured through the first sensing line SL1 and the voltage measured through the second sensing line SL2. In the process of charging the battery B at the charge C-rate, the measuring unit 110 may measure the charge voltage of the battery B through the first sensing line SL1 and the second sensing line SL2. Conversely, in the process of discharging the battery B at the discharge C-rate, the measuring unit 110 may measure the discharge voltage of the battery B through the first sensing line SL1 and the second sensing line SL2.

In addition, the measuring unit 110 may be connected to a current measuring unit through the third sensing line SL3 to measure the charge current and the discharge current of the battery B. Here, the battery B may be charged with a constant current at the charge C-rate or discharged with a constant current at the discharge C-rate.

For example, the current measuring unit may be a current sensor or a shunt resistor that is provided on a charging and discharging path of the battery B to measure the charge current and the discharge current of the battery B. Here, the charging and discharging path of the battery B may be a high current path in which a charge current is applied to the battery B or a discharge current is output from the battery B. In the embodiment of FIG. 2, the current measuring unit may be connected between the negative electrode terminal of the battery B and a negative electrode terminal P− of the battery pack 1 on the charging and discharging path of the battery B. However, it should be noted that the current measuring unit can also be connected between the positive electrode terminal of the battery B and a positive electrode terminal P+ of the battery pack 1 as long as it is on the charging and discharging path of the battery B.

The control unit 120 may be configured to receive information about the voltage and current of the battery B from the measuring unit 110.

For example, in the embodiment of FIG. 2, the control unit 120 and the measuring unit 110 may be connected to be able to communicate. The measuring unit 110 may output information about the measured charge voltage, charge current, discharge voltage and discharge current to the control unit 120, and the control unit 120 may receive the information about the voltage and current of the battery B from the measuring unit 110.

The control unit 120 may be configured to calculate a charge resistance for each voltage of the battery B based on the charge voltage and the charge current.

Specifically, the control unit 120 may calculate a charge resistance for each charge voltage by computing a ratio of the charge voltage to the charge current using Ohm's law. For example, since the battery B is charged with a constant current at the charge C-rate, the control unit 120 may calculate the charge resistance for each charge voltage by computing a change rate of the resistance with respect to the current.

The control unit 120 may be configured to calculate the discharge resistance for each voltage of the battery B based on the discharge voltage and the discharge current.

Specifically, the control unit 120 may calculate the discharge resistance for each discharge voltage by computing a ratio of the discharge voltage to the discharge current using Ohm's law in the same manner as the method of calculating the charge resistance.

Figure 3:
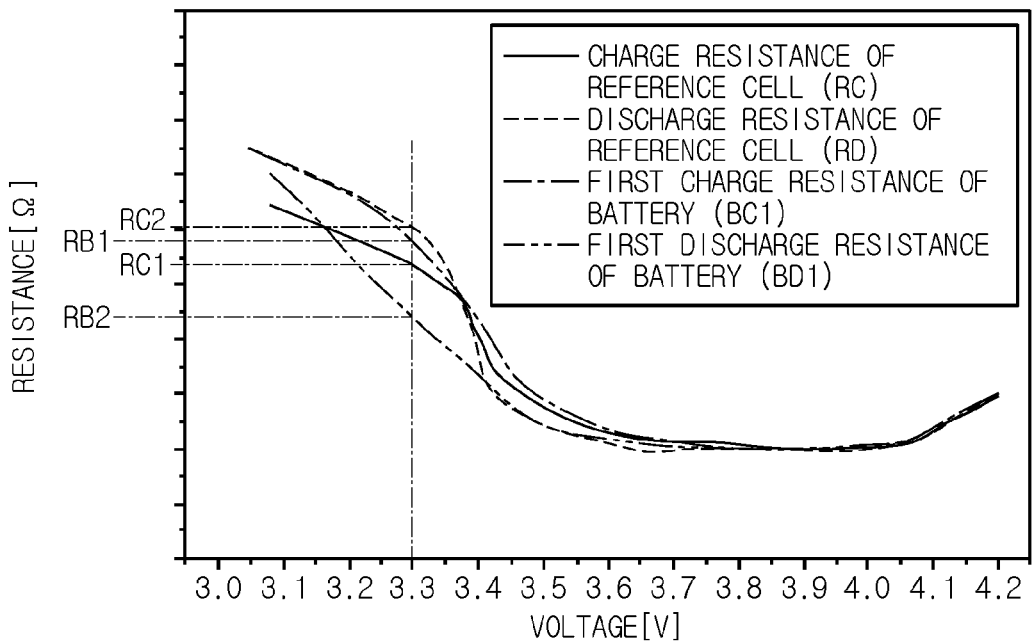
FIG. 3 is a diagram schematically showing a charge resistance and a discharge resistance of a battery according to an embodiment of the present disclosure and a reference cell.

FIG. 3 is a diagram schematically showing a charge resistance and a discharge resistance of the battery B according to an embodiment of the present disclosure and a reference cell.

In the embodiment of FIG. 3, a first charge resistance BC1 may be the charge resistance for each voltage of the battery B calculated by the control unit 120, and a first discharge resistance BD1 may be the discharge resistance for each voltage of the battery B calculated by the control unit 120.

Also, referring to FIG. 3, the reference cell may be a cell including one type of negative electrode active material, unlike the battery B. For example, the reference cell may be a cell including graphite as a negative electrode active material. If a charge resistance RC and a discharge resistance RD of the reference cell are compared with the first charge resistance BC1 and the first discharge resistance BD1 of the battery B, it may be found that the resistance hysteresis of the battery B is larger than the resistance hysteresis of the reference cell. This may be because the battery B includes different types of negative electrode active materials (e.g., graphite and silicon). Since graphite and silicon included in the battery B have different SOC regions in which capacity is expressed, the resistance hysteresis of the battery B may be greater than the resistance hysteresis of the reference cell in the low voltage region (SOC bottom region) in which capacity of silicon is expressed.

The control unit 120 may be configured to calculate a resistance ratio between the charge resistance and the discharge resistance for each voltage of the battery B.

Specifically, the control unit 120 may calculate a resistance ratio for each voltage by computing a ratio of the charge resistance to the discharge resistance for each voltage. For example, the control unit 120 may calculate a resistance ratio for each voltage by computing "charge resistance÷discharge resistance" for each voltage.

For example, in the embodiment of FIG. 3, the discharge resistance of the battery B at 3.3 V may be RB2, and the charge resistance may be RB1. The control unit 120 may calculate the resistance ratio for 3.3 V by computing "RB1÷RB2".

Meanwhile, in the embodiment of FIG. 3, the resistance ratio of the reference cell at 3.3 V may be "RC1÷RC2". That is, since the reference cell has a smaller resistance hysteresis than the battery B, the resistance ratio of the reference cell for the same voltage (3.3 V) may be smaller than the resistance ratio of the battery B.

The control unit 120 may be configured to set a discharge C-rate for the battery B based on the calculated resistance ratio for each voltage of the battery B.

Specifically, the control unit 120 may change the discharge C-rate preset for battery B based on the calculated resistance ratio. Preferably, the control unit 120 may increase the discharge C-rate based on the calculated resistance ratio. In this case, when the battery B is discharged by the increased discharge C-rate, the potential of the positive electrode in the latter half of discharge (low voltage region, SOC bottom region) may be reduced due to accumulation of positive electrode overvoltage. That is, the positive electrode potential may be reduced in a region where the capacity of silicon is exhibited. In addition, since the discharge resistance of the battery B is increased as the positive electrode potential in the latter half of discharge is decreased, the resistance hysteresis of the battery B may be decreased. That is, the resistance hysteresis of the battery B may be reduced by the discharge C-rate increased by the control unit 120.

Figure 4:
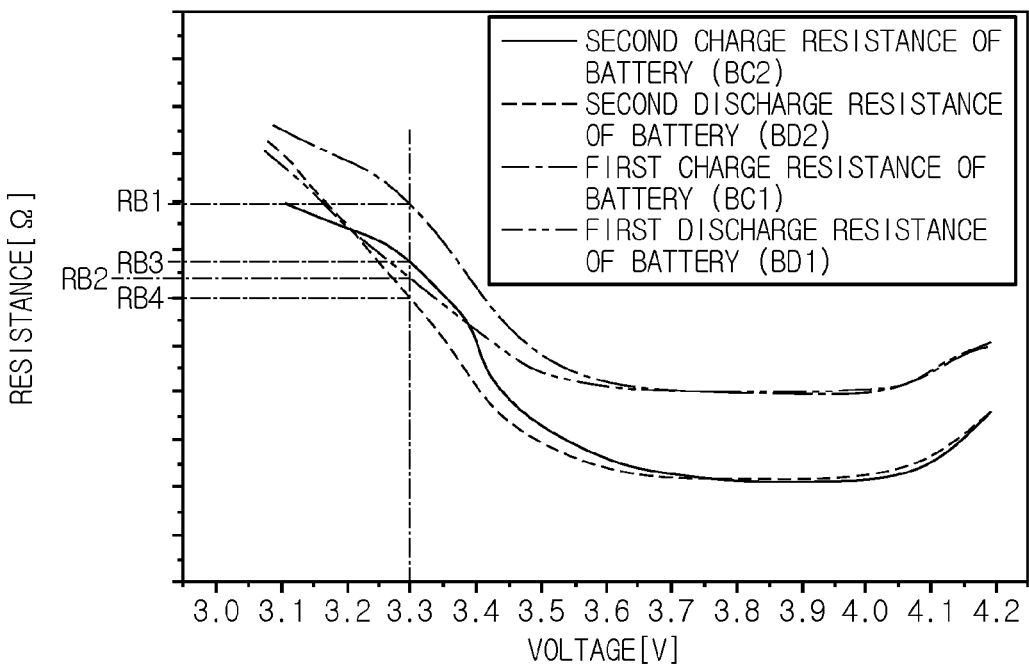
FIG. 4 is a diagram schematically showing a charge resistance and a discharge resistance of a battery in which a discharge C-rate is set according to an embodiment of the present disclosure.

FIG. 4 is a diagram schematically showing a charge resistance and a discharge resistance of the battery B in which a discharge C-rate is set according to an embodiment of the present disclosure.

In the embodiment of FIG. 4, a second charge resistance BC2 may be the charge resistance for each voltage of the battery B with a changed discharge C-rate, and a second discharge resistance BD2 may be the discharge resistance for each voltage of the battery B with a changed discharge C-rate. The first charge resistance BC1 is the same as the first charge resistance BC1 of FIG. 3, and the first discharge resistance BD1 is the same as the first discharge resistance BD1 of FIG. 3. That is, the first charge resistance BC1 and the first discharge resistance BD1 may be a resistance profile for the battery B before the discharge C-rate is changed.

Referring to FIG. 4, when the discharge C-rate is set according to the resistance ratio, it may be found that the resistance hysteresis of the battery B is reduced compared to the case where the discharge C-rate is preset. For example, before the discharge C-rate of the battery B is changed, the resistance ratio of the battery B at 3.3 V may be "RB1÷RB2". On the other hand, after the discharge C-rate of the battery B is changed, the resistance ratio of the battery B at 3.3 V may be "RB3÷RB4". After the discharge C-rate is set by the control unit 120, it may be found that the resistance hysteresis for the battery B is remarkably reduced.

That is, the battery management apparatus 100 according to an embodiment of the present disclosure has an advantage of reducing the resistance hysteresis of the battery B by appropriately setting the discharge C-rate for the battery B that includes a composite negative electrode active material in which two or more types of active materials are mixed.

Accordingly, the discharge C-rate set by the battery management apparatus 100 may be set to the discharge C-rate used in the process of operating the battery B. That is, since an optimal discharge C-rate is set for the battery B, the performance efficiency of the battery B may be improved.

Meanwhile, the control unit 120 provided in the battery management apparatus 100 may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the control unit 120 may be implemented as a set of program modules. At this time, the program module may be stored in a memory and executed by the control unit 120. The memory may be located inside or out of the control unit 120 and may be connected to the control unit 120 by various well-known means.

In addition, the battery management apparatus 100 may further include a storage unit 130. The storage unit 130 may store data necessary for operation and function of each component of the battery management apparatus 100, data generated in the process of performing the operation or function, or the like. The storage unit 130 is not particularly limited in its kind as long as it is a known information storage means that can record, erase, update and read data. As an example, the information storage means may include random access memory (RAM), flash memory, read-only memory (ROM), electrically erasable programmable read-only memory (EEPROM), registers, and the like. In addition, the storage unit 130 may store program codes in which processes executable by the control unit 120 are defined.

For example, the storage unit 130 may store the charge current, charge voltage, discharge current, and discharge voltage of the battery B measured by the measuring unit 110. Also, the storage unit 130 may store the preset charge C-rate and the preset discharge C-rate for the battery B.

Hereinafter, the resistance hysteresis and performance efficiency of the battery B will be described.

Figure 5:
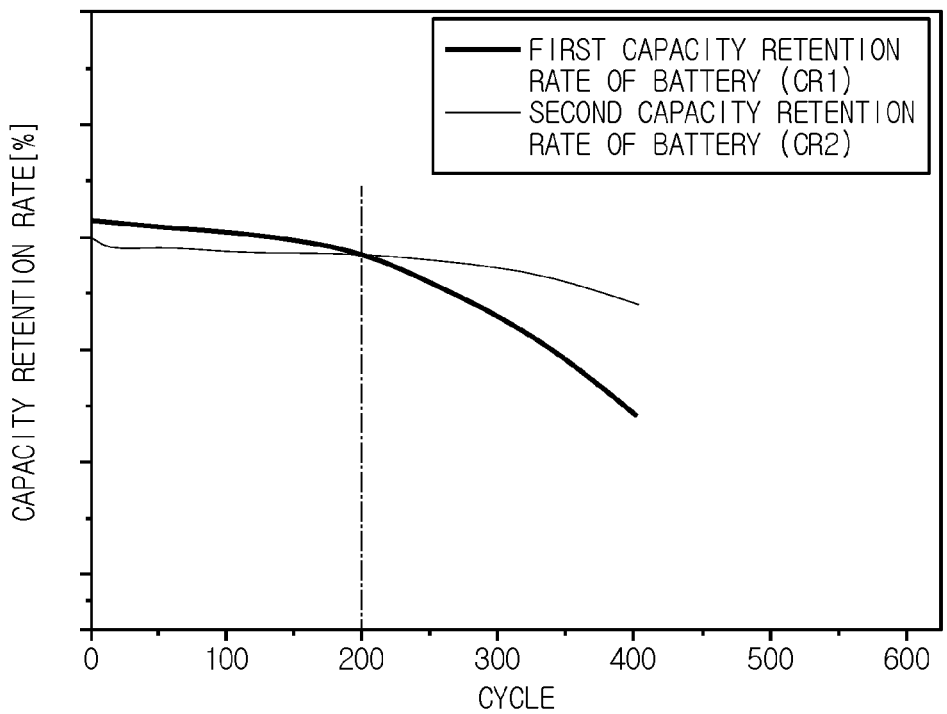
FIG. 5 is a diagram schematically showing a first capacity retention rate and a second capacity retention rate of a battery according to an embodiment of the present disclosure.

FIG. 5 is a diagram schematically showing a first capacity retention rate CR1 and a second capacity retention rate CR2 of the battery B according to an embodiment of the present disclosure.

Specifically, the embodiment of FIG. 5 is a diagram showing the first capacity retention rate CR1 of the battery B before the discharge C-rate is changed and set and the second capacity retention rate CR2 of the battery B after the discharge C-rate is changed and set. Here, the capacity retention rate may be a ratio of the capacity in a current cycle to the capacity at an initial cycle. That is, the capacity retention rate may be a ratio between the maximum capacity in the beginning of life (BOL) state and the current maximum capacity. In general, since the battery B is degraded as the cycle increases, the capacity retention rate may decrease as the cycle increases.

Referring to FIG. 5, from the $0^{th}$ cycle to the $200^{th}$ cycle, the first capacity retention rate CR1 and the second capacity retention rate CR2 of the battery B may be substantially similar. However, from the $200^{th}$ cycle, the first capacity retention rate CR1 of the battery B may be rapidly reduced compared to the second capacity retention rate CR2. Since the resistance hysteresis of the battery B is reduced by changing the discharge C-rate for the battery B, the second capacity retention rate CR2 of the battery B may be constantly maintained. Accordingly, the control unit 120 may improve the performance efficiency of the battery B by changing and setting the discharge C-rate for the battery B.

Figure 6:
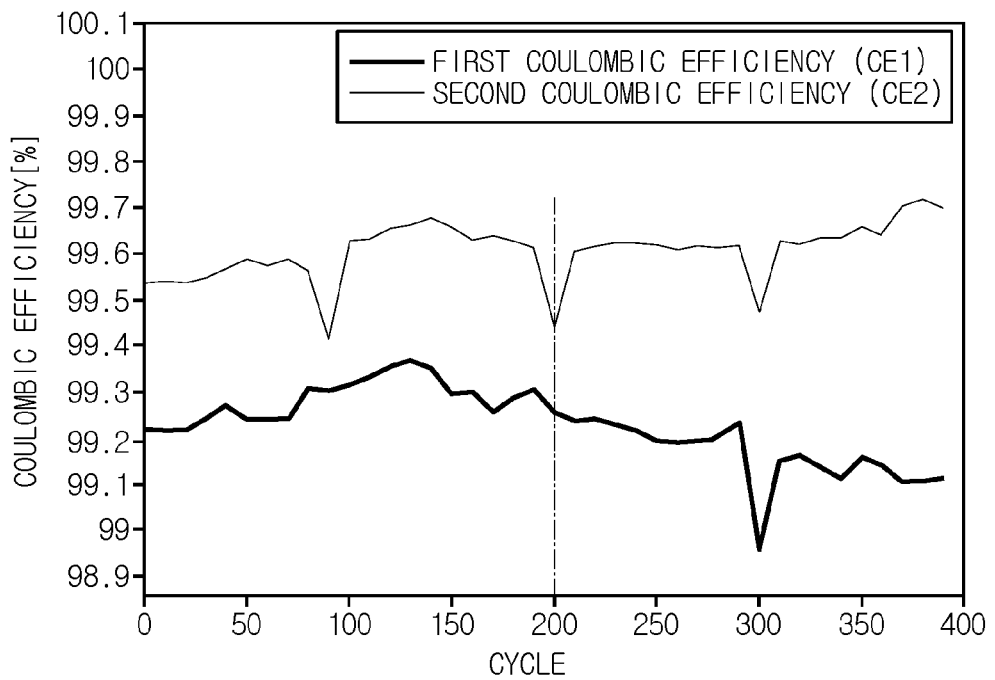
FIG. 6 is a diagram schematically showing a first coulombic efficiency and a second coulombic efficiency of a battery according to an embodiment of the present disclosure.

FIG. 6 is a diagram schematically showing a first coulombic efficiency CE1 and a second coulombic efficiency CE2 of the battery B according to an embodiment of the present disclosure.

Specifically, the embodiment of FIG. 6 is a diagram showing the first coulombic efficiency CE1 of the battery B before the discharge C-rate is changed and set and the second coulombic efficiency CE2 of the battery B after the discharge C-rate is changed and set. Here, the coulombic efficiency means a ratio of the capacity at a current cycle to the capacity at a previous cycle.

Referring to FIG. 6, from the $0^{th}$ cycle to the $200^{th}$ cycle, the first coulombic efficiency CE1 and the second coulombic efficiency CE2 of the battery B may have substantially similar forms. For example, the coulombic efficiency may be increased from the $0^{th}$ cycle to the $140^{th}$ cycle, and the coulombic efficiency may be gradually decreased from the $140^{th}$ cycle.

However, from the $200^{th}$ cycle, the first coulombic efficiency CE1 of the battery B may be rapidly reduced compared to the second coulombic efficiency CE2. Since the resistance hysteresis of the battery B is reduced by changing the discharge C-rate for the battery B, the second coulombic efficiency CE2 of the battery B may be constantly maintained. Accordingly, the control unit 120 may improve the performance efficiency of the battery B by changing the discharge C-rate for the battery B.

Hereinafter, a specific embodiment of setting the discharge C-rate for the battery B based on the resistance ratio calculated by the control unit 120 will be described.

The control unit 120 may be configured to calculate a resistance ratio for each voltage by computing a ratio of the charge resistance to the discharge resistance for each voltage of the battery B.

In the embodiment of FIG. 3, the control unit 120 may calculate the resistance ratio for each voltage by computing the ratio of the first charge resistance BC1 to the first discharge resistance BD1 for each voltage. For example, the control unit 120 may calculate the resistance ratio for 3.3 V by computing "RB1÷RB2".

The control unit 120 may be configured to select a maximum resistance ratio among the calculated resistance ratios for each voltage of the battery B.

In the embodiment of FIG. 3, the control unit 120 may select a maximum resistance ratio having a maximum value among the calculated resistance ratios after calculating the resistance ratio for each voltage.

In addition, the control unit 120 may be configured to adjust the discharge C-rate based on the selected maximum resistance ratio.

Specifically, the control unit 120 may change the discharge C-rate of the battery B when a maximum value of the resistance hysteresis (maximum resistance ratio) of the battery B is equal to or greater than a reference value. That is, the control unit 120 may maintain the discharge C-rate of the battery B as the preset discharge C-rate when the maximum resistance ratio is less than the reference value, and may change the discharge C-rate of the battery B only when the maximum resistance ratio is equal to or greater than the reference value.

For example, when the maximum resistance ratio is less than the reference value, the control unit 120 may be configured to set the discharge C-rate to the preset discharge C-rate. Conversely, when the maximum resistance ratio is equal to or greater than the reference value, the control unit 120 may be configured to change the discharge C-rate to be different from the preset discharge C-rate.

Preferably, the control unit 120 may be configured to increase the discharge C-rate to correspond to the maximum resistance ratio, and set the increased discharge C-rate to the discharge C-rate for the battery B.

Here, the control unit 120 may be configured to change the discharge C-rate to be greater than the preset charge C-rate for the battery B.

As described above, if the discharge C-rate is increased to be greater than the charge C-rate, the positive electrode potential may decrease in the region where the capacity of silicon included in the battery B is exhibited due to accumulation of positive electrode overvoltage. Accordingly, as the battery B is discharged by the discharge C-rate that is increased to be greater than the charge C-rate, the resistance hysteresis of the battery B may be reduced.

Specifically, the control unit 120 may be configured to increase the discharge C-rate based on the maximum resistance ratio and the battery B characteristic factor corresponding to the battery B. For example, the control unit 120 may set the discharge C-rate according to the following formula.

$$DCm = DCn \times Max \times \alpha \quad \text{[Formula]}$$

Here, DCm is a discharge C-rate set according to the Formula, and DCn is a preset discharge C-rate. In addition, Max is a maximum resistance ratio, and $\alpha$ is a battery B characteristic factor.

For example, the battery B characteristic factor ($\alpha$) may be set based on the design specification of the battery B. As a specific example, the battery B characteristic factor ($\alpha$) may be a variable that can be set according to the loading of a positive electrode capacity of the battery B, the content of conductive material, the type of positive electrode material, the type of negative electrode material, the number of moles of electrolyte salt, and the like.

For example, in the case of the battery B having a positive electrode capacity loading of 5 mA/cm$^2$, the battery B characteristic factor ($\alpha$) may be set to a number less than 1.

If the discharge C-rate (DCm) set according to the Formula is less than or equal to the charge C-rate, the battery B characteristic factor ($\alpha$) may be adjusted. In addition, so that the calculated discharge C-rate may be greater than the charge C-rate, the control unit 120 may recalculate the discharge C-rate based on the adjusted battery B characteristic factor ($\alpha$).

The battery management apparatus 100 according to the present disclosure may be applied to a BMS (Battery Management System). That is, the BMS according to the present disclosure may include the battery management apparatus 100 described above. In this configuration, at least some of the components of the battery management apparatus 100 may be implemented by supplementing or adding functions of the configuration included in the conventional BMS. For example, the measuring unit 110, the control unit 120 and the storage unit 130 may be implemented as components of the BMS.

In addition, the battery management apparatus 100 according to the present disclosure may be provided in a battery pack 1. That is, the battery pack 1 according to the present disclosure may include the above-described battery management apparatus 100 and one or more batteries B. In addition, the battery pack 1 may further include electrical equipment (relays, fuses, etc.) and a case.

For example, FIG. 2 is a diagram schematically showing an exemplary configuration of a battery pack 1 including the battery management apparatus 100. Referring to FIG. 2, the battery pack 1 may include a battery B, a current measuring unit, and the battery management apparatus 100.

The charging and discharging unit 200 may be included in the battery pack 1 and may be electrically connected to an electrode terminal of the battery pack 1. In the embodiment of FIG. 2, the charging and discharging unit 200 may be connected to a positive electrode terminal (P+) and a negative electrode terminal (P−) of the battery pack 1.

While the battery B is being charged by the charging and discharging unit 200, the measuring unit 110 may measure a charge current and a charge voltage of the battery B. In addition, while the battery B is discharged by the charging and discharging unit 200, the measuring unit 110 may measure a discharge current and a discharge voltage of the battery B.

For example, the charging and discharging unit 200 may fully charge the battery B from 0% to 100% of SOC, and may completely discharge the battery B from 100% to 0% of SOC.

Figure 7:
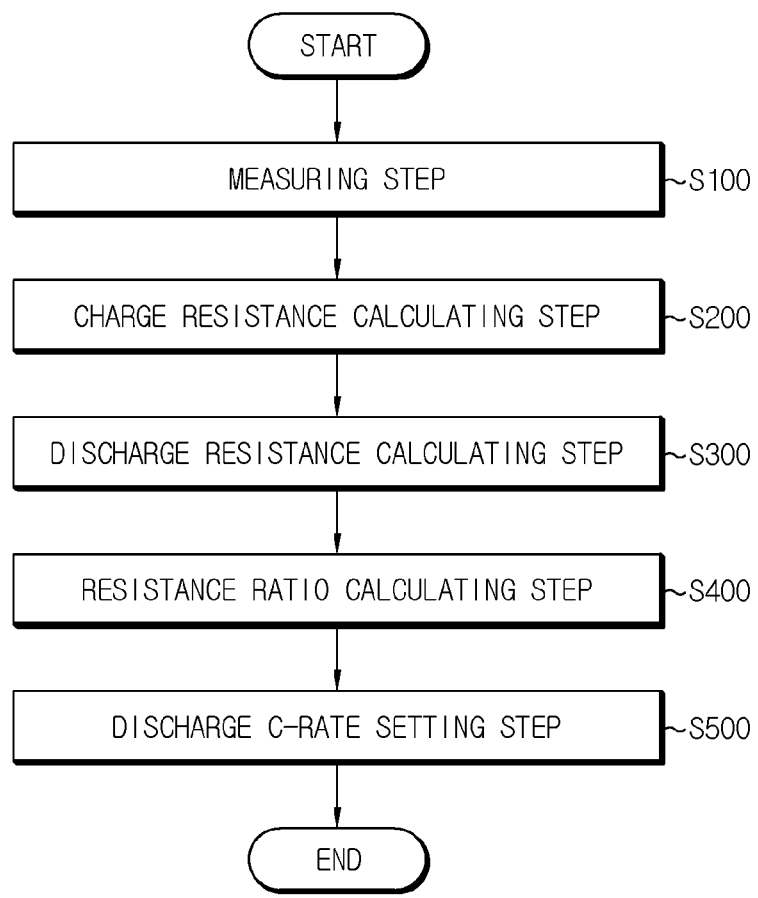
FIG. 7 is a diagram schematically showing a battery management method according to another embodiment of the present disclosure.

FIG. 7 is a diagram schematically showing a battery management method according to another embodiment of the present disclosure.

Preferably, each step of the battery management method may be performed by the battery management apparatus 100. Hereinafter, it should be noted that contents overlapping with the previously described contents will be omitted or briefly described.

Referring to FIG. 7, the battery management method includes a measuring step (S100), a charge resistance calculating step (S200), a discharge resistance calculating step (S300), a resistance ratio calculating step (S400) and a discharge C-rate setting step (S500).

The measuring step (S100) is a step of measuring a charge voltage, a charge current, a discharge voltage and a discharge current in the process of charging and discharging a battery B according to a preset charge C-rate and a preset discharge C-rate, and may be performed by the measuring unit 110.

Preferably, the measuring unit 110 may measure a charge voltage and a charge current in the process of charging the battery B at a preset charge C-rate. In addition, the measuring unit 110 may measure a discharge voltage and a discharge current in the process of discharging the battery B at a preset discharge C-rate.

The charge resistance calculating step (S200) is a step of calculating a charge resistance for each voltage of the battery B based on the charge voltage and the charge current, and may be performed by the control unit 120.

For example, the control unit 120 may calculate a charge resistance by calculating a ratio of a charge voltage to a charge current.

The discharge resistance calculating step (S300) is a step of calculating a discharge resistance for each voltage of the battery B based on the discharge voltage and the discharge current, and may be performed by the control unit 120.

For example, the control unit 120 may calculate the discharge resistance by calculating a ratio of a discharge voltage to a discharge current.

In the above, although it is illustrated that the discharge resistance calculating step (S300) proceeds after the charge resistance calculating step (S200) according to the embodiment of FIG. 7, but it should be understood that the discharge resistance calculating step (S300) may proceed first and then the charge resistance calculating step (S200) may proceed.

The resistance ratio calculating step (S400) is a step of calculating a resistance ratio between the charge resistance and the discharge resistance for each voltage of the battery B, and may be performed by the control unit 120.

Specifically, for each voltage, the control unit 120 may calculate a resistance ratio by calculating the ratio of charge resistance to discharge resistance. For example, in the embodiment of FIG. 3, the control unit 120 may calculate a resistance ratio for 3.3 V by computing "RB1÷RB2".

The discharge C-rate setting step (S500) is a step of setting a discharge C-rate for the battery B based on the calculated resistance ratio for each voltage of the battery B, and may be performed by the control unit 120.

Specifically, the control unit 120 may select a maximum resistance ratio among a plurality of resistance ratios calculated for each voltage of the battery B. In addition, if the selected maximum resistance ratio is equal to or greater than a reference value, the control unit 120 may change the discharge C-rate for the battery B based on the selected maximum resistance ratio, the battery B characteristic factor, and the preset discharge C-rate.

Preferably, the control unit 120 may improve the performance efficiency of the battery B by increasing the discharge C-rate for the battery B so that the discharge C-rate for the battery B is greater than the charge C-rate.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

1: battery pack
100: battery management apparatus
110: measuring unit
120: control unit
130: storage unit
200: charging and discharging unit

What is claimed is:

1. A battery management apparatus, comprising:
a voltage sensor configured to measure a charge voltage and a discharge voltage at a plurality of voltage levels of a battery during charging and discharging of the battery according to a preset charge current rate (C-rate) and a preset discharge C-rate;
a current sensor configured to measure a charge current and a discharge current during the charging and discharging of the battery; and
a controller configured to:
calculate a charge resistance for each measured charge voltage of the battery based on the charge voltage and the charge current measured during charging the battery,
calculate a discharge resistance for each measured discharge voltage of the battery based on the discharge voltage and the discharge current measured during discharging the battery,
for each voltage level of the battery at which charge voltage and discharge voltage are measured, calculate a resistance ratio between the charge resistance at the voltage level and the discharge resistance at the voltage level, and
set an updated discharge C-rate for the battery based on the calculated resistance ratios.

2. The battery management apparatus according to claim 1,
wherein the resistance ratio is a ratio of the charge resistance to the discharge resistance.

3. The battery management apparatus according to claim 1,
wherein the controller is configured to:
select a maximum resistance ratio from among the calculated resistance ratios; and
adjust the discharge C-rate based on the selected maximum resistance ratio.

4. The battery management apparatus according to claim 3,
wherein the controller is configured to:

maintain the discharge C-rate at the preset discharge C-rate in response to the maximum resistance ratio being less than a reference value; and change the discharge C-rate to the updated discharge C-rate in response to the maximum resistance ratio being equal to or greater than the reference value.

5. The battery management apparatus according to claim 4, wherein the updated discharge C-rate is greater than the preset charge C-rate.

6. The battery management apparatus according to claim 3, wherein the updated discharge C-rate corresponds to the maximum resistance ratio.

7. The battery management apparatus according to claim 6, wherein the updated discharge C-rate is based on the maximum resistance ratio and a battery characteristic factor of the battery.

8. The battery management apparatus according to claim 1, wherein the battery includes a composite negative electrode active material in which graphite and silicon are mixed.

9. The battery management apparatus according to claim 1, wherein the voltage sensor is configured to measure the charge voltage and the current sensor is configured to measure the charge current during charging the battery at the preset charge C-rate with a first constant current, and wherein the voltage sensor is configured to measure the discharge voltage and the current sensor is configured to measure the discharge current during discharging the battery at the preset discharge C-rate with a second constant current.

10. A battery pack, comprising the battery management apparatus according to claim 1.

11. A battery management method, comprising:

measuring, by a voltage sensor, a charge voltage and a discharge voltage at a plurality of voltage levels of a battery during charging and discharging of the battery according to a preset charge C-rate and a preset discharge C-rate, respectively;

measuring, by a current sensor, a charge current and a discharge current during the charging and discharging of the battery;

calculating, by a controller, a charge resistance for each measured charge voltage of the battery based on the charge voltage and the charge current measured during charging the battery;

calculating, by the controller, a discharge resistance for each voltage of the battery based on the discharge voltage and the discharge current;

for each voltage level of the battery at which charge voltage and discharge voltage are measured, calculating, by the controller, a resistance ratio between the charge resistance at the voltage level and the discharge resistance at the voltage level; and setting, by the controller, a discharge C-rate for the battery based on the calculated resistance ratios.

12. The battery management method according to claim 11, further comprising discharging the battery at the updated discharge C-rate.

* * * * *